United States Patent [19]
Smith

[11] 3,764,867
[45] Oct. 9, 1973

[54] TRACTION MOTOR SPEED REGULATION FOR PROPULSION SYSTEMS PROVIDING SMOOTH STEPLESS CHANGES IN SPEED AND AUTOMATIC WHEEL SLIP CONTROL

[75] Inventor: Russell M. Smith, North East, Pa.
[73] Assignee: General Electric Company, Erie, Pa.
[22] Filed: Nov. 14, 1972
[21] Appl. No.: 306,411

[52] U.S. Cl.................... 318/52, 318/79, 318/109, 318/111
[51] Int. Cl. ............................................. H02p 1/16
[58] Field of Search...................... 318/52, 79, 109, 318/111

[56] References Cited
UNITED STATES PATENTS

| | | | |
|---|---|---|---|
| 2,930,957 | 3/1960 | Cronberger | 318/79 X |
| 3,210,630 | 10/1965 | Zelina | 318/52 |
| 3,257,597 | 6/1966 | Weiser | 318/344 |
| 3,663,875 | 5/1972 | Ashiya | 318/52 |

*Primary Examiner*—B. Dobeck
*Attorney*—Charles W. Helzer et al.

[57] ABSTRACT

A traction motor tractive effort regulator for propulsion systems employing multiple series type direct current traction motors and providing smooth stepless changes in tractive effort together with automatic wheel slip control. Current controlling resistors are are connected in series circuit relationship with the respective serially connected field and armature windings of a string of serially connected traction motors across a main power source of direct current excitation. Main control switches are provided for variably controlling the value of the current controlling resistors connected in series, series-parallel and/or parallel circuit relationship with the traction motors for variably controlling the torque of the motors and hence the tractive effort of the vehicle. Means are provided for supplying a separate excitation source of direct current connected across the respective field windings of the direct current traction motors in parallel with and in addition to the excitation provided by the main power source. Ancillary control means are included for varying the magnitude of the separate direct current excitation supplied through the respective field windings independently of and in conjunction with the main current controlling resistors. The separate excitation source of direct current is connected across the respective field windings of the traction motor with a polarity such that the separate direct current excitation adds to the normal excitation direct current supplied from the main power source through the variable current control resistor, and the ancillary control means controls the magnitude of the separate direct current excitation supplied to the respective field windings in a manner to steplessly control the magnitude of the armature current and hence the tractive effort of the respective traction motors during each step change in value of the series current controlling resistors whereby smooth, stepless changes in torque of the traction motors can be achieved with the regulator. For this purpose current sensing devices are coupled to the respective traction motors for deriving an output indication of the tractive effort. The output indication of actual tractive effort is compared to an input reference signal in a suitable comparator which derives an output error command signal that controls operation of the ancillary control means. The ancillary control means in turn controls the magnitude of the separate direct current excitation supplied to the respective field windings independently of and complementary with the main current controlling resistors whereby smooth, stepless changes in motor torque are achieved. Additionally, wheel slippage detecting devices are provided for detecting slippage of the respective traction motors and deriving an output indication of such slippage. A wheel slip control circuit is responsive to the wheel slippage detector and is coupled to control the ancillary control means for the slipping traction motor so as to reduce the field current of the slipping motor, and thereby quickly reduce its tractive effort. Simultaneously, the wheel slip control circuit provides an increase in field current to the nonslipping traction motors so as to maintain the tractive effort of each nonslipping motor substantially constant by appropriately decreasing the armature current or at least preventing an increase in the armature current.

22 Claims, 10 Drawing Figures

United States Patent [19]
Smith
[11] 3,764,867
[45] Oct. 9, 1973
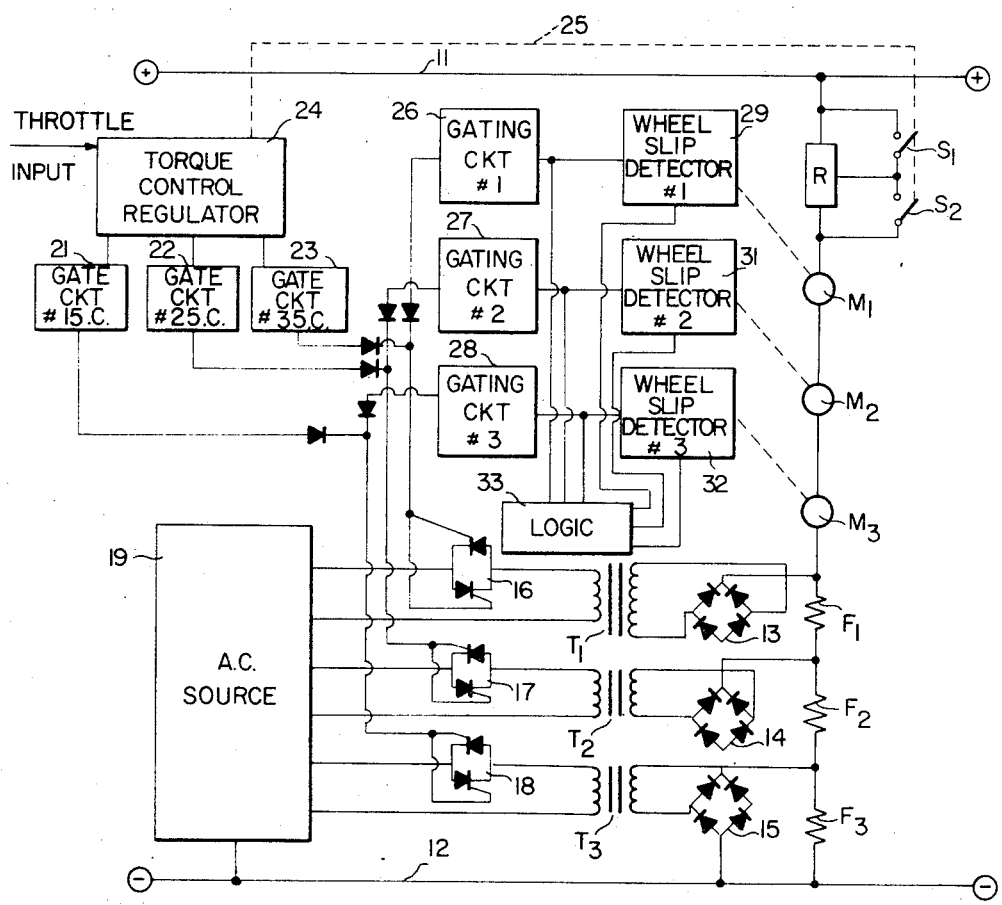

TRACTION MOTOR SPEED REGULATION FOR PROPULSION SYSTEMS PROVIDING SMOOTH STEPLESS CHANGES IN SPEED AND AUTOMATIC WHEEL SLIP CONTROL

BACKGROUND OF INVENTION

This invention relates to a new and improved motor current regulator for propulsion systems employing a number of series type direct current traction motors having the field and armature windings connected in series electrical circuit relationship and used on electric locomotives, electric subway cars, rolling mill drives and the like.

More specifically, the invention relates to a motor speed regulator for such propulsion systems which provides smooth stepless changes in motor torque and automatic wheel slip control.

BACKGROUND PRIOR ART

Propulsion systems for electric locomotives, electric subway cars, rolling mill drives and the like, which employ series direct current traction motors many times are excited from a separate, fixed voltage, direct current power supply having some fixed voltage value such as 600 volts, 1500 volts, 3000 volts, etc. The direct current traction motors normally are connected in series electrical circuit relationship with each other and also in series with current controlling resistors having a large value of resistance which may be switched in or out of the circuit with the fixed voltage power supply for speed controlling purposes. Initially, upon starting, most if not all of the resistance is included in the series circuit, and as the train speeds-up, the resistance is cut out in steps to apply greater voltage across the series traction motors. Eventually, the fields of the traction motors are shunted to decrease the back EMF of the motors and increase the armature current drawn to thereby increase the tractive effort of the motors. Thereafter, the series connection of the motors may be changed to a series-parallel connection and the resistance reinserted for further changes in speed. The reverse procedure is undertaken where slowing or deceleration is desired. At each point whereby current controlling resistors are switched in or out of the circuit, stepped changes in the tractive effort (and hence acceleration) generally occur unless special measures are provided to prevent or overcome such stepped changes.

Heretofore, only those propulsion systems utilizing shunt direct current traction motors wherein the field of the motor is connected in shunt or parallel with the armature winding, were capable of providing (smooth) changes in speed during the interval while current controlling resistors were being switched in or out of circuit with the traction motors. For the most part, these known shunt motor speed regulator arrangements employed semiconductor control devices which acted to automatically reduce (or increase) the excitation of the shunt field winding simultaneously with changes in value of the speed controlling resistor to provide essentially stepless control. However, these known arrangements are not workable with series type direct current traction motors. U. S. Pat. No. 3,378,743 issued Apr. 16, 1968 and 3,257,597 issued June 21, 1966 to E. F. Weiser — assigned to the General Electric Company, describe suitable control circuits for DC series type traction motors which provide essentially smooth stepless control of the speed of the motors together with wheel slip control. However, these known systems require either a high power alternating current supply or employ derivative and filter networks of a sophisticated and complex nature for maintaining regulation within a predetermined regulation band. While this system is suitable for many purposes, it is complex, and expensive to construct, maintain and operate. For this reason, it is desirable to provide an improved traction motor speed regulator for propulsion systems which provide smooth stepless changes in motor torque and hence vehicle acceleration together with automatic wheel slip control.

There are two inherent difficulties encountered with the provision of a suitable speed regulator for series type traction motor propulsion systems operating from a fixed direct current supply. The first of these difficulties is due to the effect of switching in and out different current controlling resistors in discrete steps and which produce a "notched" or "stepped" effect in the tractive effort of the vehicle. The second difficulty is due to the fact that limiting values of adhesion may exist midway between the tractive effort steps or notches, and hence, wheel slip may occur. With existing control systems, correction of wheel slip during changes in speed is difficult and slow due to the necessity of opening current controlling resistor contactors in order to make required corrections in a stepped manner. Control of the wheel slip is further aggravated by the fact that if one motor in a series string of motors slips, it tends to produce a greater back EMF which in turn is taken from the other nonslipping motors connected in the series string. As a result, where wheel slippage occurs, the slipping motor terminal voltage actually tends to increase and make the slip worse. With the proposed invention, these difficulties can be overcome, and series type DC traction motor propulsion systems operating from fixed direct current power supplies can be given all of the desirable characteristics obtained from other more sophisticated and expensive propulsion system controls.

SUMMARY OF INVENTION

It is therefore a primary object of the present invention to provide a new and improved traction motor speed regulator for propulsion systems employing series type direct current traction motors wherein smooth, stepless changes in tractive effort can be achieved along with automatic wheel slip control.

In practicing the invention, a traction motor speed regulator is provided for propulsion systems employing multiple series type direct current traction motors having the field and armature windings thereof connected in series electrical circuit relationship. The regulator comprises variable impedance means formed by current controlling resistors connected in series circuit relationship with the respective serially connected field and armature windings of a plurality of DC traction motors across a main power source of direct current excitation. Main speed control means in the form of speed control switches are provided for variably controlling the value of speed control resistors connected in series with the direct current traction motors in a known manner. In addition, a separate means is provided for supplying a separate excitation source of direct current which is connected across the respective field windings of the direct current traction motors in parallel with and in addition to the excitation provided by the main power source. Ancillary control means are provided for varying the magnitude of the separate direct current excitation supplied through the respective field windings independently of and in conjunction with the main current control means provided by the current controlling resistors. The separate excitation source of direct current is connected across the respective field windings of the traction motors with a polarity such that the separate direct current excitation adds to the normal excitation direct current supplied to the respective field windings by the main power source through the current controlling resistors, and the ancillary control means controls the magnitude of the separate direct current excitation supplied to the respective field windings in a manner to control the armature current and hence, the tractive effort of the respective traction motors whereby smooth, stepless changes in torque of the traction motors can be achieved with the regulator.

The improved motor regulator further includes traction motor tractive effort sensing means coupled to the respective traction motors for deriving output indications of the actual value of the tractive effort of the motors. Operator throttle controlled input means are provided for generating an input command tractive effort reference signal which is representative of a desired command level of tractive effort, and this reference signal is supplied to a comparison means along with the output indication of the actual tractive effort derived by the sensing means. The output error control signal derived from the comparison means is then fed back to control operation of the ancillary control means so as to vary the magnitude of the separate direct current excitation supplied to the respective field windings independently of and complementary with the main speed control resistors in a manner such that the portion of the field excitation current coming from the separate excitation source is adjusted up or down complementary with the switching in or out of the speed control resistors so as to maintain essentially stepless, smooth changes in field current and hence, tractive effort of the traction motors. In case of wheel slip, the new and improved regulator operates so as to reduce the field current of the slipping traction motors and simultaneously increases the field current of the non-slipping motors to thereby reduce the torque (tractive effort) of the slipping motor. By proper operation of the new and improved regulator it is possible to reduce the total armature current flowing in the series string of traction motors, so that the tractive effort of the non-slipping motors is either increased or preferably is held substantially constant as a result of the increase in their field current although the tractive effort of the slipping motors is reduced due to the fact that their field current is reduced.

BRIEF DESCRIPTION OF DRAWINGS

These and other objects, features and many of the attendant advantages of this invention will be appreciated more readily as the same becomes better understood by reference to the following detailed description, when considered in connection with the accompanying drawings, wherein like parts in each of the several FIGS. are identified by the same reference character, and wherein.

DETAILED DESCRIPTION OF PREFERRED EMBODIMENTS

With propulsion systems employing series motors connected in a series string across a fixed direct current power source as contemplated by the present invention, some conflicting requirements have to be met in order to provide proper control over the auxiliary field current that is employed by the regulator herein proposed. It can be demonstrated that:

$$T = \phi K I_a \qquad (1)$$

where:
- $T$ equals tractive effort or torque;
- $\phi$ equals the flux produced by the total current $I_f$ flowing in the field windings of the traction motors where $I_f = I_a + I_{aux}$ and $I_{aux}$ equals the auxiliary current supplied to the field windings of the motor in accordance with the invention;
- $K$ equals a constant;
- $I_a$ is the armature current flowing through the series string of traction motors.

From a consideration of equation (1) it will be appreciated that if $I_a$ is reduced, then $\phi$ or $I_f$ must be brought to a higher level if the motor tractive effort is to remain constant with respect to non-slipping wheels.

Figure 1:
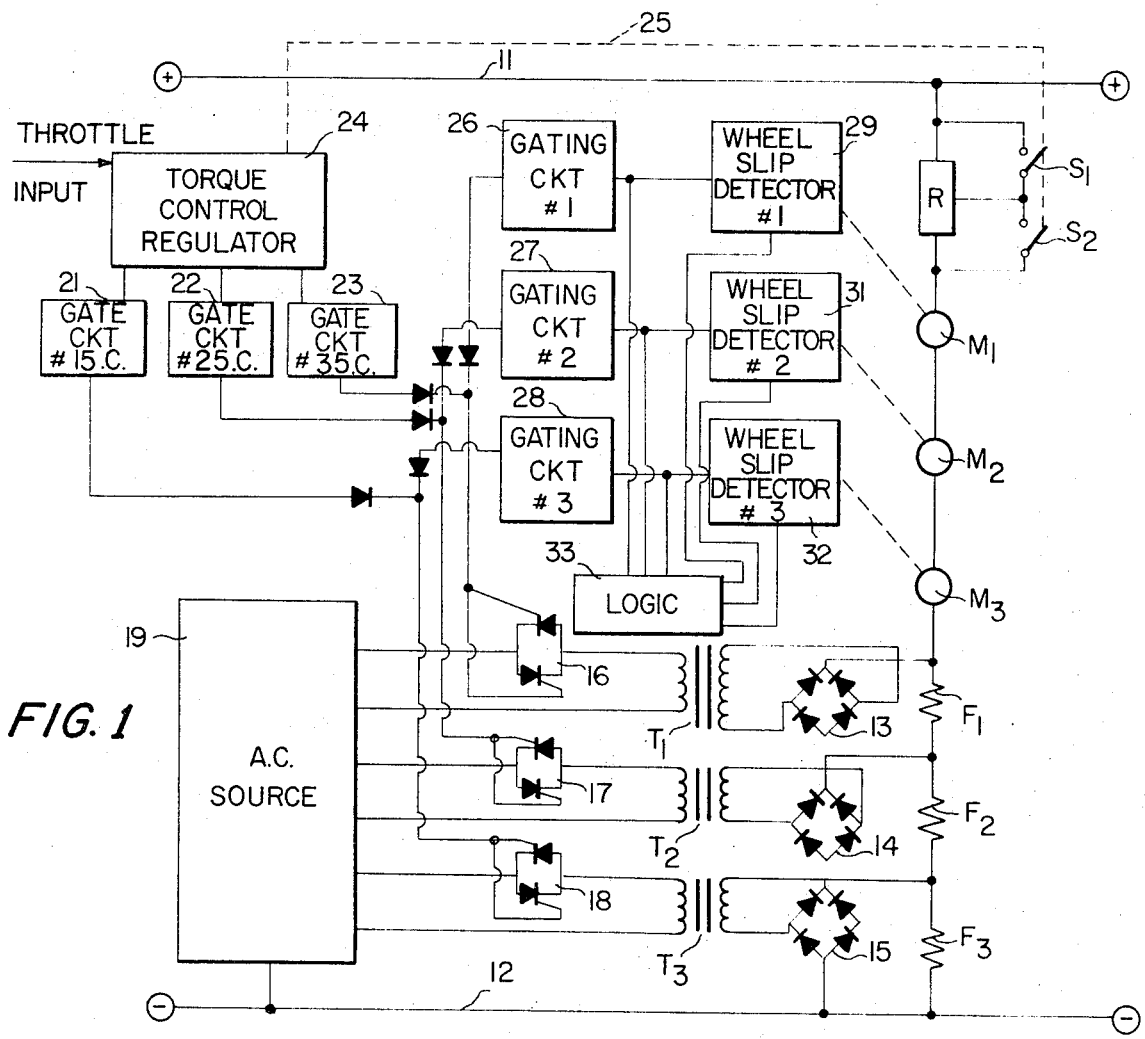
FIG. 1 is a functional block diagram of one form of a new and improved speed regulator for series type traction motor propulsion systems constructed in accordance with the invention.

Considering, for example, FIG. 1, if motor No. $M_1$ should slip, its back EMF goes up directly as its speed, and as a consequence, the current through the motor ($I_a$) decreases because the counter EMF which is the sum of the back EMF of the whole series string of three motors $M_1$, $M_2$ and $M_3$ rises and, hence, the armature current $I_a$ going through all three series motors falls. This will result in a reduction of the back EMF of the two non-slipping motors if no further corrective action is taken. Consequently, because of the decrease in back EMF of the non-slipping motors, the slipping motor terminal voltage actually increases tending to make the slip worse. In order to correct for the slip, the field current of the non-slipping motors should be increased so as to raise their back EMF to a level greater than it was before the slip occurred, and the field current of the slipping motor should be decreased to thereby decrease the tractive effort of the slipping motor due to the fact that both the field current $I_f$ and the armature current $I_a$ have decreased.

In contrast to the above requirements during wheel slip conditions, however, the motor torque regulator must work during non-slip conditions as for example, when a locomotive's speed changes and the series accelerating resistors are being cut out or in to control motor current and torque. Under these latter conditions where an increase in speed is desired and a resistor is cut out, the terminal voltage on the whole string of series connected traction motors rises and the armature current $I_a$ increases as a result. In order to provide a stepless or uniform acceleration, however, it is necessary to keep the motor tractive effort constant by increasing the field current (at least temporarily following cut out of the accelerating resistors) to all non-slipping motors to thereby increase their back EMF and prevent such increase in armature current $I_a$ due to cutting out series resistance. Acceleration is regulated by setting a throttle input reference, FIG. 1, calling for any desired $I_a$ or motor torque. It is essential therefore that the motor current regulator be capable of recognizing these conflicting requirements, and act accordingly.

FIG. 1 is a functional block diagram of a proposed new and improved vehicle speed regulator capable of achieving smooth, stepless control of the changes in acceleration of a locomotive or other vehicle being powered by a series type direct current traction motor system. A plurality of three series type, direct current traction motors whose armatures are shown at $M_1$, $M_2$ and $M_3$ are connected in series circuit relationship with the field windings thereof $F_1$, $F_2$ and $F_3$, respectively, and with a variable impedance R comprised by a current controlling resistor whose resistance value is under the control of a plurality of switches $S_1$, $S_2$, etc. The series circuit thus comprised is connected across a main power source of direct current excitation comprised by direct current power supply terminals 11 and 12. Direct current locomotives or other electrically driven vehicles normally use current controlling resistors such as R in series with the traction motors for obtaining steps of tractive effort. This is combined quite often with field shunting to give the operator of the locomotive or other vehicle control over its speed, and produces steps in the tractive effort as discrete values of resistance are switched in or switched out of circuit relationship with the traction motors. In addition, there may be changes in the combinations of the motors from a series arrangement, such as that shown in FIG. 1, to a series-parallel, or to a parallel arrangement. Irrespective of the arrangement used, the stepped changes in tractive effort (acceleration) make wheel slip control difficult since limiting values of adhesion may exist mid-way between the notches or steps in tractive effort. Under such circumstances, correction of the wheel slip is made difficult due to the necessity of dropping contactors in the controlling switches $S_1$, $S_2$, etc. and their inherent time lags.

With the speed regulator proposed in the present invention and illustrated functionally in FIG. 1, the number of resistance steps in the main current controlling resistors are reduced and field shunting as such is eliminated. In this arrangement, it is proposed to provide a separate excitation source of direct current for connection across the respective field windings of the DC traction motors. In FIG. 1, this separate excitation source comprises bridge rectifiers 13, 14 and 15 whose output terminals are connected across the respective field windings $F_1$, $F_2$, and $F_3$. The bridge rectifiers 13, 14 and 15 are supplied through transformers $T_1$, $T_2$ and $T_3$ which in turn are excited from phase controlling SCRs 16, 17 and 18 supplied from a suitable source of alternating current shown at 19 that may comprise a chopper-inverter, motor generator set, etc., operated from the main DC supply lines 11 and 12. If desired, three phase alternating current could be employed, or the controlling SCRs could be connected in the bridge rectifiers 13, 14 and 15, but the principle of operation would be unchanged, and would result in the same manner of control over the auxiliary excitation current $I_{aux}$ flowing in the respective field windings $F_1$, $F_2$ and $F_3$. To allow for the auxiliary excitation current $I_{aux}$, it is preferred that the series exciting field windings be designed to have fewer turns than normally would be provided for motors of the same given ratings and design specifications.

The phase controlled SCRs 16, 17 and 18 have their control gates connected to the output of respective gate control circuits 21, 22, and 23 which in turn are controlled by an auxiliary torque control regulator 24. This regulator 24 will function, by means to be described, to hold a value of motor current called for by the throttle input. Motor current sets a level of motor torque which in turn must equal the sum of the torques required by the vehicle acceleration plus losses, plus trailing load. The auxiliary torque control regulator 24 is designed to complement the operation of the main resistor bank R through the interconnection shown by the dotted lines 25 interconnecting the speed control switch bank $S_1$, $S_2$, etc. with the auxiliary torque control regulator 24. In addition, the control gates of the phase control SCRs 16, 17 and 18 are connected through respective isolating diodes to the output of a second set of gating circuits 26, 27 and 28 which are, in turn, individually controlled from the output of wheel slip detection circuits 29, 31 and 32, respectively. The wheel slip detection circuits are mechanically or otherwise arranged to detect wheel slippage in any of the motors $M_1$, $M_2$ and $M_3$ as indicated by the dotted line interconnection between the respective motors and their associated wheel slip detection circuits. Upon occurrence of wheel slip, the wheel slip detection circuit of the slipping motor will cause its associated gating circuit 26, 27 or 28 to control the firing of the phase control SCRs 16, 17, and 18 respectively, in a manner to cut back or reduce the auxiliary field current $I_{aux}$ being supplied to the respective field winding $F_1$, $F_2$, $F_3$ from its associated bridge rectifier 13, 14 and 15, respectively. Simultaneously, the wheel slip signal is supplied to a logic unit shown at 33 which causes the wheel slip detectors and gating circuits of the remaining, non-slipping traction motors to increase the auxiliary field current $I_{aux}$ being supplied to the respective field windings of the non-slipping motors.

With the motor vehicle regulator shown in FIG. 1, when a starting situation exists, maximum auxiliary field current $I_{aux}$ is supplied by the phase control SCRs 16, 17 and 18 through bridge rectifiers 13, 14 and 15 to the respective traction motor field windings $F_1$, $F_2$, $F_3$. The back EMF of the traction motors $M_1$, $M_2$, and $M_3$ is regulated partly by the speed of the motors and partly by varying the portion of the total field excitation current $I_f$ supplied from the bridge rectifiers, namely, the auxiliary field current $I_{aux}$. Since the auxiliary field current $I_{aux}$ is continuously variable by changing the phasing of the phase control SCRs 16, 17 and 18 through the medium of torque control regulator 24 and the respective gate control circuits 21, 22 and 23, it is possible to provide smooth stepless control of the rotor armature current, and hence tractive effort and ultimately the speed of the motors, within the range of auxiliary field current $I_{aux}$ provided by the phase control SCRs 16, 17 and 18.

At the point where the phase control SCR output is reduced to zero as the motor speed increases, the next step of resistance of speed controlling resistor R is cut out by appropriate closure of the speed control switches $S_1$, $S_2$, etc. Simultaneously with this operation, through the interconnection 25, the auxiliary field current $I_{aux}$ is increased by appropriate control of the phase control SCRs 16, 17 and 18 via torque control regulator 24 and the gate circuits 21, 22 and 23. As a consequence, the back EMF of the traction motors will increase and the armature current $I_a$ through the series string of motors will remain substantially constant despite the stepped increase in terminal voltage across the series string of motors. Actually, it is a constant torque or tractive effort that is desired, hence, the traction motors should be over excited so as to reduce the armature current and keep the motor torque constant. Thereafter, the torque control regulator 24 is adjusted in response to control actions of the operator via a throttle command to gradually reduce the auxiliary field current $I_{aux}$ supplied to the respective field windings in a linear, smooth manner as described previously to thereby provide smooth, stepless control to achieve changes in speed of the traction motors. It is believed obvious that decreases in speed would be achieved in precisely the same fashion but in reverse order from that described above with respect to increasing speed changes.

In case of wheel slip, the wheel slip detector for the slipping wheel (for example assumed to be 29) will supply through its gating circuit 26 appropriate phase control gating signals to phase control SCR 16 in a direction to quickly reduce the auxiliary field current $I_{aux}$ supplied to the field winding $F_1$. Simultaneously, logic circuit 33 interconnected with all wheel slip detectors and their associated gating circuits, causes the wheel slip detectors 31 and 32 of non-slipping traction motors $M_2$ and $M_3$ to operate through their gating circuits 27 and 28 in a manner to increase the auxiliary field current $I_{aux}$ being supplied to the respective field windings $F_2$ and $F_3$ of the non-slipping motors $M_2$ and $M_3$. In this manner, it is possible to reduce the total armature current $I_a$ in the series string of traction motors so that the torque or tractive effort of the non-slipping motors is not increased as a result of the increase in field current, although the torque or tractive effort of the slipping motor is reduced as a result of the reduction of both its field current and the armature current $I_a$ through the entire series string.

Figure 2:
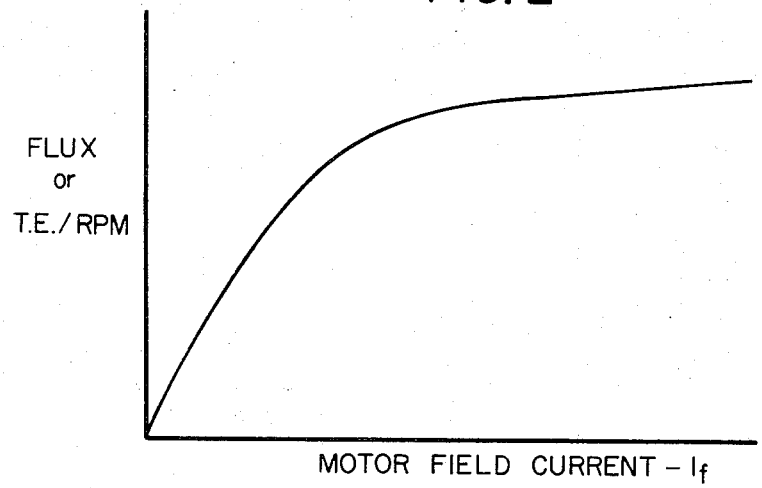
FIG. 2 is a characteristic curve showing the change in flux or tractive effort at a given speed with changes in motor field current.

FIG. 2 of the drawings is a characteristic curve illustrating the change in flux $\phi$ or tractive effort for a given speed with changes in the motor field current $I_f$ due to changes in the auxiliary field current $I_{aux}$ being fed through the field windings. From a consideration of FIG. 2, it will be appreciated that essentially smooth, stepless control of changes in speed of the series type DC traction motors can be achieved in this manner.

As stated earlier, there are two basic conflicting requirements for a traction motor torque regulator such as shown in FIG. 1 of the drawings. With such a regulator, to correct for wheel slip, the field current of the non-slipping motors should be increased to raise their back EMF to a level equal to or greater than existed prior to slipping with a resultant decrease in armature current $I_a$, and simultaneously the field current of the slipping motor should be decreased to reduce its torque. In contrast to this requirement during wheel slip, however, is the requirement that for the motor torque regulator to work properly as a motor torque control during non-slip conditions. For example, when it is desired to change the speed of the locomotive or other vehicle and an accelerating resistor is cut out to increase speed, the voltage on the whole series string of traction motors rises and the armature current $I_a$ increases as a result. Under this condition, it is desired simultaneously to decrease the motor torque by increasing the field current of all non-slipping motors to thereby increase their back EMF and decrease the armature current $I_a$ or at least hold it constant, and hence hold the tractive effort substantially constant, at least temporarily at the instant of accelerating resistor switching. Thereafter, the firing phase of the SCR's is slowly advanced by appropriate control of speed control 24 via the throttle command to slowly and smoothly decrease the auxiliary field current $I_{aux}$ and thereby provide smooth, stepless changes in speed. Clearly, then the traction motor torque regulator must be capable of recognizing the conflicting requirements between normal acceleration/deceleration and wheel slip, and act accordingly.

Figure 3:
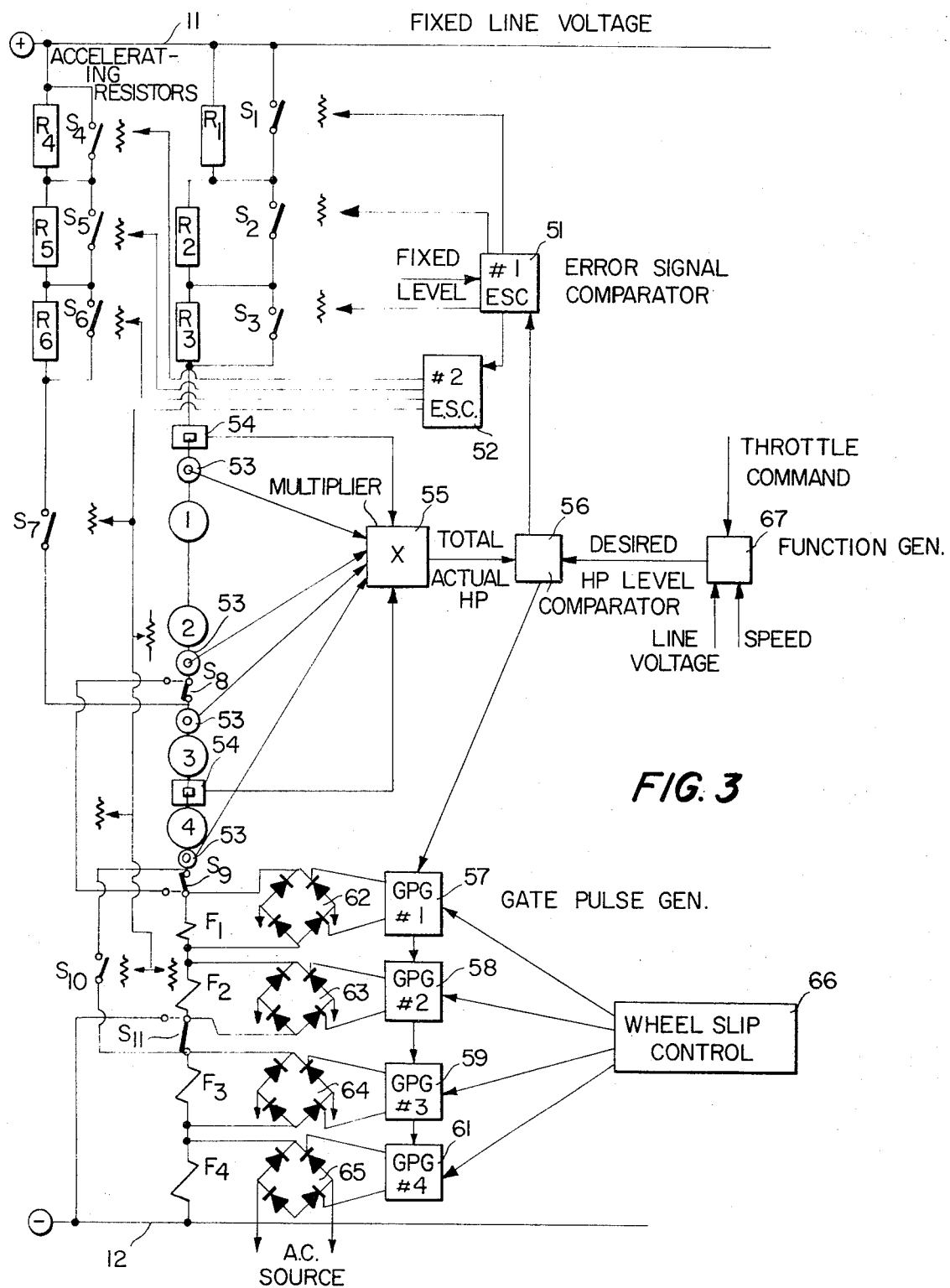
FIG. 3 is a functional block diagram of a preferred form of traction motor speed regulator constructed in accordance with the invention.

FIG. 3 of the drawings is a more detailed, schematic block diagram of a preferred vehicle speed regulator constructed in accordance with the invention. In FIG. 3, a plurality series type direct current traction motors 1, 2, 3 and 4 having their field windings $F_1$ through $F_4$ connected in series circuit relationship with the armatures thereof and with a pluarlity of accelerating resistors $R_1$, $R_2$, and $R_3$ across a fixed direct current power supply line shown at 11 and 12. The accelerating resistors $R_1$ through $R_3$ are switched in and out of series circuit relationship with the string of series connected DC traction motors 1 through 4 by means of a plurality of relay-actuated speed switches $S_1$ to $S_3$ in a known manner, with the switches $S_1$ through $S_3$ in turn being controlled by the output from an error signal comparator No. 1 whose function will be described more fully hereinafter in connection with the description of the operation of the overall motor speed regulator. Additionally, the plurality of traction motors 1 through 4 and their associated, respective field windings $F_1$ through $F_4$ can appropriately be switched into a series-parallel arrangement wherein the motors 3 and 4 and their associated field windings $F_3$, $F_4$ are connected in series circuit relationship with a second string of speed controlling accelerating resistors $R_4$ through $R_6$ that in turn are separately controlled by relay actuated switches $S_4$ through $S_6$ under the control of a second error signal comparator No. 2.

Upon appropriate actuation of the relay control switches $S_7$ through $S_{11}$ by error signal comparator No. 2, the switches $S_7$ through $S_{11}$ will be thrown from their solid line position shown to the dotted line position thereby connecting the two pairs of series direct current traction motors 1, 2 and 3, 4 in a series-parallel arrangement in a well known manner. Thereafter, the speed controlling resistors $R_4$ through $R_6$ selectively may be switched in and out of circuits through appropriate actuation of their associated relay actuated speed controlling switches $S_4$ through $S_6$ in conjunction with the speed controlling action of the accelerating resistors $R_1$ through $R_3$ and their associated relay actuated speed controlling switches $S_1$ through $S_3$ in a well known manner. It will be appreciated that the accelerating resistors $R_1$ through $R_6$ in fact comprise variable impedance means which are connected in series circuit relationship with the respective serially connected field and armature windings of the traction motors 1 through 4 across a main power source of direct current excitation 11 and 12, and that the relay actuated switches $S_1$ through $S_{11}$ constitute main speed control means for variably controlling the value of the variable impedance to thereby variably control the speed of the direct current traction motors.

Since the torque or tractive effort out of the traction motors is the quantity that is to be controlled, it is necessary for the present motor vehicle speed regulator to derive a control signal proportional to torque for use in its controlling action. While there are a number of techniques available for deriving or obtaining such a control signal, because of their complexity, sensitivity, difficulty of maintanence, etc., there is a preferred technique. For example, the torque could be measured directly. Alternatively, it would be possible to measure the armature current $I_a$ and the field current $I_f$, and then derive the desired torque measurement through appropriate manipulation of equation (1). Unfortunately, however, because of the saturation characteristics of the motor, the flux $\phi$ and field current $I_f$ are not related in a linear fashion but are related as shown in FIG. 2 of the drawings, thus requiring a relatively complex function generator capable of compensating for this characteristic. The preferred arrangement is as shown in FIG. 3 wherein the voltage across the motors are measured by voltage measuring means 53 of any suitable type for deriving a measure of the terminal voltage across the motors 1 through 4. Additionally, armature current measuring means shown at 54 are provided for obtaining a measure of the armature current flowing through the motors 1 through 4. The traction motor terminal voltage (less the exciting field voltage) and the armature current values are supplied to a multiplier 55 of any conventional construction which multiplies these two values together and provides an output product which is representative of the kilowatts applied to the motors. At any given speed, this product is also proportional to torque, neglecting only the fact that the efficiency of the motor also changes with speed and current. The output signal from multiplier 55 which is proportional to the actual measured torque of the traction motors 1 through 4 then is supplied to a comparator circuit 56 also of conventional construction.

A function generator 57 of known construction is provided which is supplied with a number of inputs from various sources such as a throttle command (i.e. acceleration called for by an operator of the locomotive or other electric vehicle), line voltage, vehicle speed, etc. The function generator 67 combines each of these input parameters to derive an output signal representative of desired horsepower level which likewise is supplied to the comparator 56 in conjunction with the actual measured horsepower derived from multiplier 55. Comparator 56 then compares the desired horsepower signal to the actual horsepower signal and derives an output error control signal which is supplied to an ancillary control means comprised by a plurality of gating circuits 57 through 61 to control the firing angles of the phase controlled SCR bridges 62–65, respectively. The gating control circuits 57 through 61 may comprise conventional, commercially available gating control circuits for silicon control rectifiers such as those manufactured and sold by the Crydom Controls Division of the International Rectifier Company, Santa Ana, Calif. and described in their bulletin No. 2.20 Revision No. 2. Gating control circuits of this type have both turn-on and turn-off gate pulse generator windings to which the error control signals from comparator 56 are supplied for either increasing or decreasing the phase angle at which the SCRs includes in bridge rectifiers 62 through 65 are fired with respect to the phase of a supply alternating current source (not shown) connected across opposite supply terminals of the respective bridge rectifiers 62–65.

The bridge rectifiers 62 through 65 constitute independent and separate sources of direct current excitation for the respective field windings $F_1$ through $F_4$, respectively, for providing the auxiliary field current component $I_{aux}$. With the arrangement shown in FIG. 3, the gating control circuits 57 through 61 are intially set to supply maximum auxiliary field current $I_{aux}$ to the respective field windings $F_1$ through $F_4$ from the associated bridge rectifiers 62 through 65 upon the locomotive or other vehicle initially starting from a stopped position. As the locomotive speeds up, the terminal voltage across the string of motors rises and the armature current $I_a$ tends to decrease as a result. The net effect, however, is a decrease in Volts x Amperer. The measured actual horsepower supplied from multiplier 55 to comparator 56 will decrease compared the desired or command horsepower level and results in the production of an error control signal to the gating control circuits 57 through 61, which causes a decrease in the auxiliary field current $I_{aux}$ supplied to the respective field windings $F_1$ through $F_4$. This, in turn, results in a decrease back EMF which causes an increase in the armature current tending to keep the horsepower output constant or responsive to the predetermined schedule set by the function generator 67. The operator through the medium of the throttle command may at any time select a different power level and advance the firing phase angle of the gating control circuits 57 through 61 to reduce the auxiliary field current $I_{aux}$ and allow smooth increases in speed. Correspondingly, decreases in speed are achieved in the same manner.

The output from comparator 56 is also supplied as one of the inputs to a first error signal comparator 51 which compares the error signal from comparator 56 with some fixed reference level signal. This fixed reference level signal, if exceeded, represents a condition where the auxiliary field current $I_{aux}$ supplied from the bridge rectifiers 62 through 65 under the control of the gating control circuits 57 through 61, has reached some limit (either zero or maximum) and further increases or decreases in horsepower must be met by changing the accelerating series resistors $R_1$, $R_2$, $R_3$, etc., or by changing the motor connections from the straight series traction motor arrangement shown in FIG. 3, to a parallel-series arrangement indicated by the phantom line interconnections. The error signal comparator 51 determines at what point these connections should be made, and operates through suitable relay actuated speed controlling switches $S_1$, $S_2$ and $S_3$ and also through a No. 2 error signal comparator 52 to make the desired parallel-series connections for the motors under appropriate conditions.

Although the vehicle speed regulator shown in FIG. 3 as thus far described, will operate satisfactorily for locomotive speed changes due to throttle demand increases or decreases as series resistance steps are cut out or cut in, it will not function properly to correct wheel slip on one or more axles. This is due to the fact that the control system thus far described will react differently depending on whether the speed is low or high as will be determined from the following list.

| Speed | Low | High |
|---|---|---|
| Accelerating resistor ohms | high | low |
| Net hp change resulting from slip on slipping motor | up | down |
| Resultant control action on motor field | | decrease |
| Result on slipping motor | bad | good |
| Result on non-slipping motor | good | bad |

Figure 4:
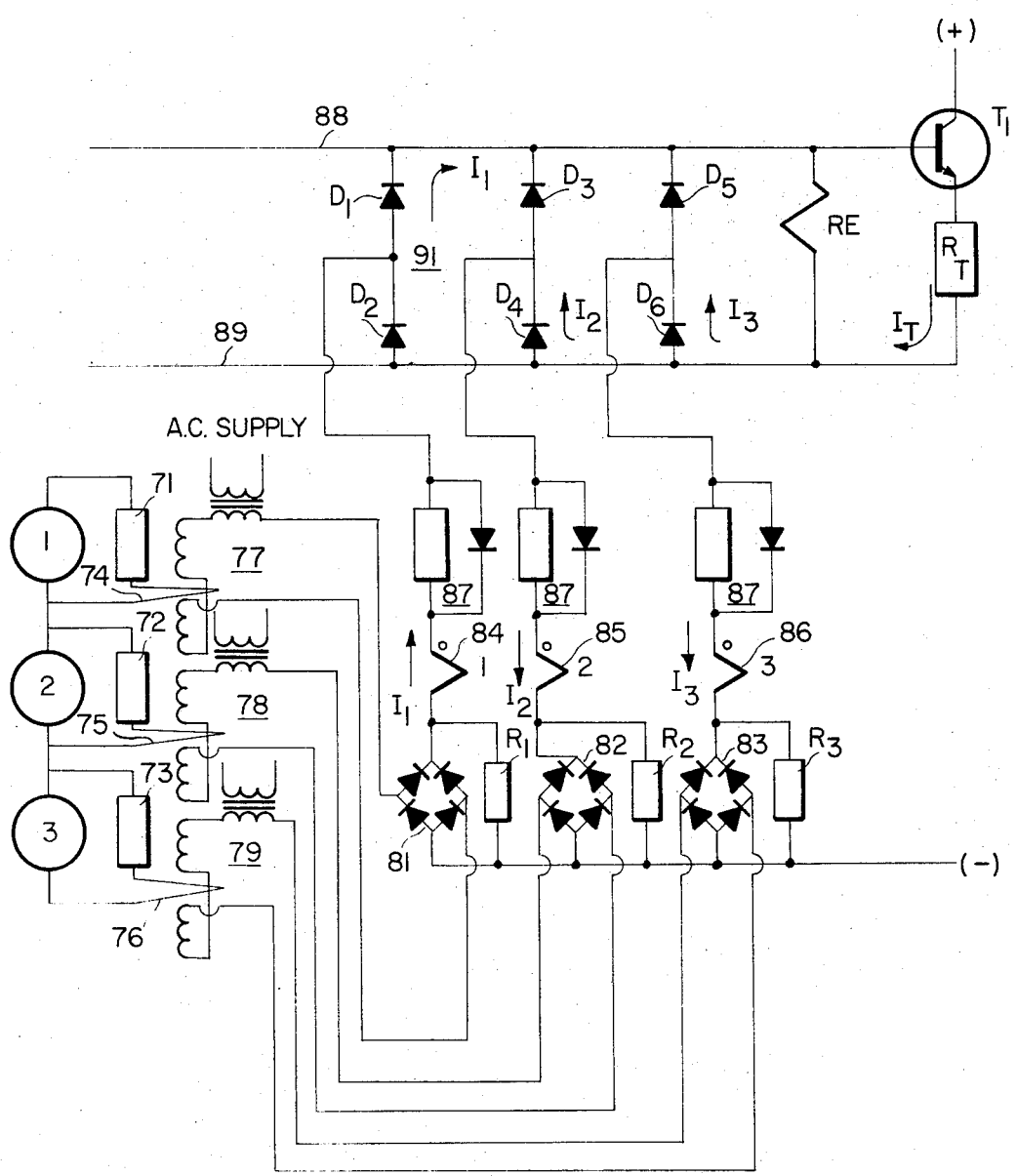
FIG. 4 is a detailed circuit diagram of a preferred form of speed sensing and wheel slip detection circuit suitable for use in the speed regulator shown in FIG. 3.

From a consideration of the above listing, it will be appreciated that the wheel slip control for the motor speed regulator, shown generally at 66 in FIG. 3, must operate independently of the normal speed control elements of the system. FIG. 4 is a detailed circuit diagram of a preferred form of wheel slip detection and control suitable for use as the element 66 of FIG. 3 for controlling operation of the gating circuits 57–61 of the motor speed regulator during wheel slip conditions. For convenience, only three motors have been shown in FIG. 4, however, extension of the arrangement to include control for four or more even fewer motors is believed obvious to one skilled in the art in the light of the teachings of FIG. 4. The armatures of the direct current traction motor are connected in a series string as shown at 1, 2 and 3 in FIG. 4. Connected across each of the armatures of the respective direct current series type traction motors is a current limiting resistor 71, 72 and 73 which supplies control current through the control windings 74, 75 and 76 of associated direct current saturable reactor voltage measuring devices 77, 78 and 79, respectively, which are excited from a suitable low voltage alternating current supply source (not shown). The saturable reactor voltage measuring devices 77 through 79 are of conventional construction and function to derive output armature voltage signals which are representative of the armature voltage, and hence speed of rotation of the respective traction motors 1 through 3. These output armature voltage signals are supplied across diagonally opposite terminals of associated bridge rectifiers 81, 82 and 83, respectively, whose remaining diagonally opposite terminals are connected across respective load resistors $R_1$, $R_2$, $R_3$. One terminal of the load resistors $R_1 - R_3$ is connected to the negative terminal of a low voltage direct current power supply and the remaining terminals of the load resistors $R_1$, $R_2$ and $R_3$ are connected through the gate pulse generator control windings 84, 85 and 86 of the gating control circuits 57, 58, 59, etc. respectively, of the motor speed regulator system shown in FIG. 3. The remaining terminals of load resistors $R_1 - R_3$ also are connected through respective parallel connected limiting resistors and bypass diode pairs 87 to the diode junction of respective arms of a diode comparison bridge comprised by series connected diode pairs $D_1$, $D_2$; diodes $D_3$, $D_4$; diodes $D_5$, $D_6$, $D_7$, etc. The cathodes of the diodes $D_1$, $D_3$, $D_5$, etc. are connected to a common terminal 88 and the anode of the diodes $D_2$, $D_4$, $D_6$, etc. are connected to a common terminal 89. An emitter-follower amplifier is formed by an NPN transistor $T_1$ having its base connected to the common terminal 88 and having its emitter connected through an emitter load resistor $R_T$ to the common terminal 89. The collector of transistor $T_1$ is connected to the positive terminal of the low voltage, direct current power supply whose negative terminal is connected in common to one terminal of the load resistors $R_1$, $R_2$, $R_3$, etc., and an indicating relay coil $R_e$ is connected across the terminals 88 and 89 to provide an output indication of an unbalance condition in the diode comparison bridge 91.

In operation, if, for example, the axle of traction motor No. 1 slips, the current produced across the output of its associated voltage measuring reactor 77 and supplied to diode rectifier bridge 81 increases thereby increasing the voltage across the load resistor $R_1$, making this voltage greater than the corresponding voltages across $R_2$ or $F_2$. As a consequence current $I_1$ will flow through the associated gate pulse generator winding 84 controlling the gate control circuit 57 that, in turn, controls the amount of auxiliary field current $I_{aux}$ supplied through the field winding $F_1$ of motor No. 1 in a direction to cause it to turn off (decrease the auxiliary field current $I_{aux}$). Current $I_1$ will also flow through diode $D_1$ and through the base-emitter of emitter-follower amplifier $T_1$, $R_T$ as well as through the indicating coil relay winding $R_e$. Transistor $T_1$ amplifies this current so that a current $I_T$ greater than $I_1$ is supplied back through diodes $D_4$ and $D_6$ as inverse currents $I_2$ and $I_3$, respectively. Inverse currents $I_2$ and $I_3$, flow through the associated gate pulse windings 85 and 86 in a direction to cause the respective gate control circuits 58 and 59 controlled by these windings to turn on (increase the auxiliary field current $I_{aux}$) supplied to the respective field windings $F_2$ and $F_3$ under the control of these units. Thus, it will be appreciated that the wheel slip control arrangement shown in FIG. 4 results in a current flowing through gate pulse winding 84 which causes a decrease in the total field current flowing in the slipping motor, and simultaneously causes an increase in the total field current flowing through the field windings of the non-slipping motors. By providing the wheel slip detection and control arrangement shown in FIG. 4 as the wheel slip control element 66 in the overall motor speed regulator of FIG. 3, a suitable control system is provided which will meet the requirements set forth earlier.

Figure 5:
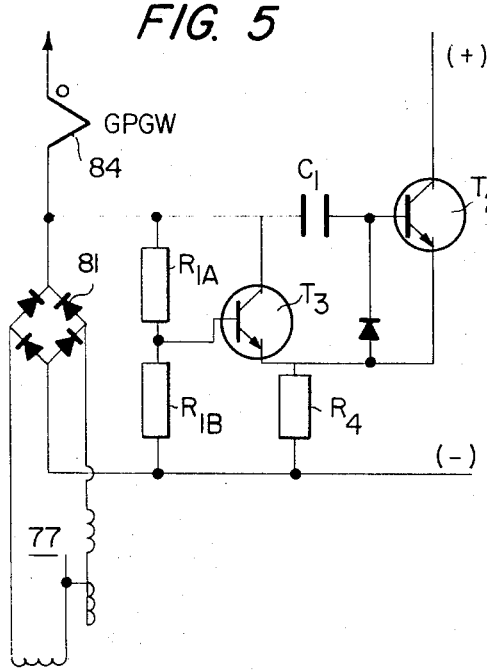
FIG. 5 is a detailed circuit diagram of a modified form of the wheel slip detection shown in FIG. 4 which provides for sensing the rate of wheel slippage and deriving a suitable control current in accordance with the sensed rate.

If desired, over-correction, or early anticipation of wheel slip can be achieved by the addition of a circuit responsive to rate of change of wheel speed. Such a circuit modification is illustrated in FIG. 5 of the drawings for use in connection with the wheel slip detection and control shemem of FIG. 4. The load on rectifier bridge 81 is comprised by resistors $R_{1A}$ and $R_{1B}$ acting as a high resistance voltage divider together with emitter-follower amplifier $T_3$. When transistor $T_2$ conducts as a result of a positive change in voltage out of rectifier bridge 81, it increases the voltage across emitter load resistor $R_4$ which tends to turn off the transistor $T_3$, and hence increases the load resistance to rectifier bridge 81. Since the rectifier bridge 81 and the associated circuit arrangement operates as a constant current source, the output volts across the bridge increases causing current flowing through the gate pulse generator winding 84 to have a "rate" effect. Thus, it will be appreciated that by appropriate modification of the wheel slip detection and control scheme shown in FIG. 4 to include the "rate" sensing arrangement of FIG. 5 for each gating control circuit employed in the overall traction motor regulator, the system can be provided with a capability of over-correcting or early anticipation and correction of wheel slip upon its occurrence.

Figure 6:
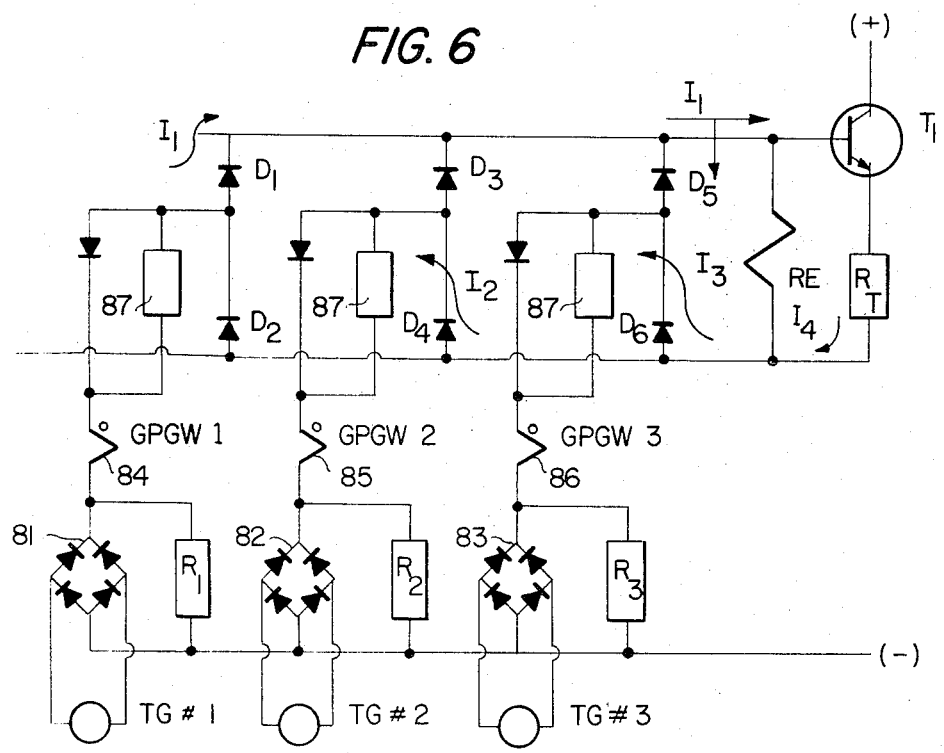
FIG. 6 is an alternative form of wheel slippage detection scheme utilizing tachometer generators and which is suitable for use in the motor speed regulator of FIG. 3.

FIG. 6 of the drawing is a detailed circuit diagram of an alternative wheel slip detection and control scheme suitable for use in the traction motor regulator of FIG. 3 in place of that of FIG. 4. The arrangement of FIG. 6 differs from the FIG. 4 scheme in that it employs tachometer generators $TG_1$, $TG_2$, and $TG_3$ in place of the voltage measuring reactors 77, 78 and 79 used in the scheme of FIG. 4. The tachometer generators 1, 2 and 3 operate to derive output voltages which are applied across the diagonally opposite input terminals of their respective diode rectifier bridges 81 and 82 and 83, and which are representative of the speed of the respective traction motors 1, 2, 3, etc. Except for this difference, the wheel detection scheme of FIG. 6 is entirely similar in construction and operation to the arrangement of FIG. 4. If in FIG. 6, the axle driven by motor No. 1 slips, the voltage out of its speed sensing tachometer $TG_1$ rises, and the voltage across the resistor $R_1$ then becomes greater than the voltage across $R_2$ or $R_3$. Hence, current $I_1$ flows through the gate pulse generator winding 84 in a direction to turn off its associated gating circuit 57 (shown in FIG. 3) to thereby decrease the auxiliary field current $I_{aux}$ being supplied to the respective field winding $F_1$. Current $I_1$ then flows through the base-emitter junction of transistor $T_1$ as well as through the indicating relay coil $R_e$. Transistor $T_1$ amplifies the current to provide an output current $I_T$ which is split into inverse currents $I_2$ and $I_3$ that pass through the comparison diodes $D_4$ and $D_6$ and are supplied in an inverse manner to the gate pulse generator windings 85 and 86 in a direction to increase the auxiliary motor field current supplied to the respective field windings $F_2$, $F_3$, etc., of the non-slipping motors.

Figure 7:
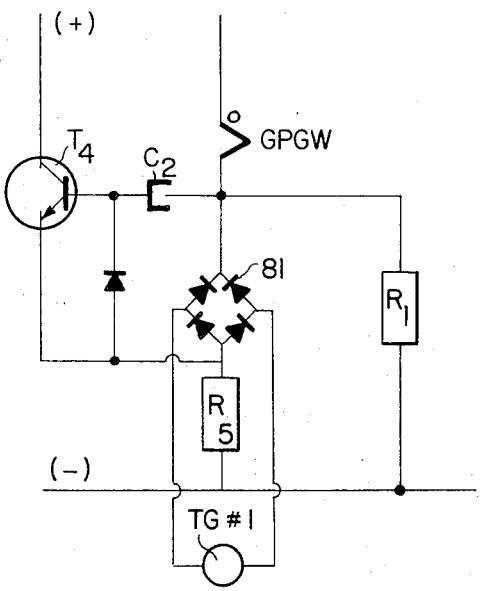
FIG. 7 is a detailed circuit diagram of a rate measuring circuit which can be employed in conjuction with the wheel slippage detection arrangement of FIG. 6.

The arrangement of FIG. 6 similarly can be supplied with a rate responsive circuit such as shown in FIG. 7. The nature of the "rate" responsive circuit to be employed depends upon whether the wheel slip sensing device is primarily a current source as is true for the DC measuring reactor system of FIGS. 4 and 5, or whether the wheel slip sensing device is a voltage source as is true of the tachometer generator used in the arrangement of FIG. 6. In the circuit of FIG. 7, a "rate" of voltage change proportional to speed from the rectifier bridge 81 supplied from tachometer generator No. 1, produces a current through capacitor 62 which is amplified by emitter-follower amplifier $T_4$, $R_5$. The current that passes through $R_5$ is effectively in series with the rectifier bridge 81, and results in raising the voltage out of the rectifier bridge and supplied across load resistor $R_1$ relative to the other load resistors $R_2$, $R_3$, etc. Here again the increase in voltage appearing across $R_1$ will have a "rate" effect.

Figure 8:
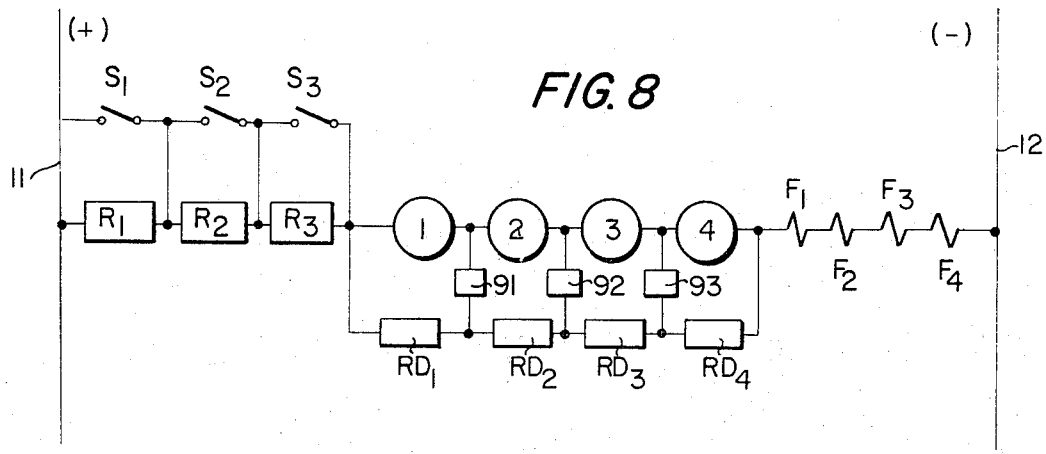
FIG. 8 is a functional block diagram of still another form of wheel slippage detection scheme employing a resistor bridge measuring arrangement.
Figure 9:
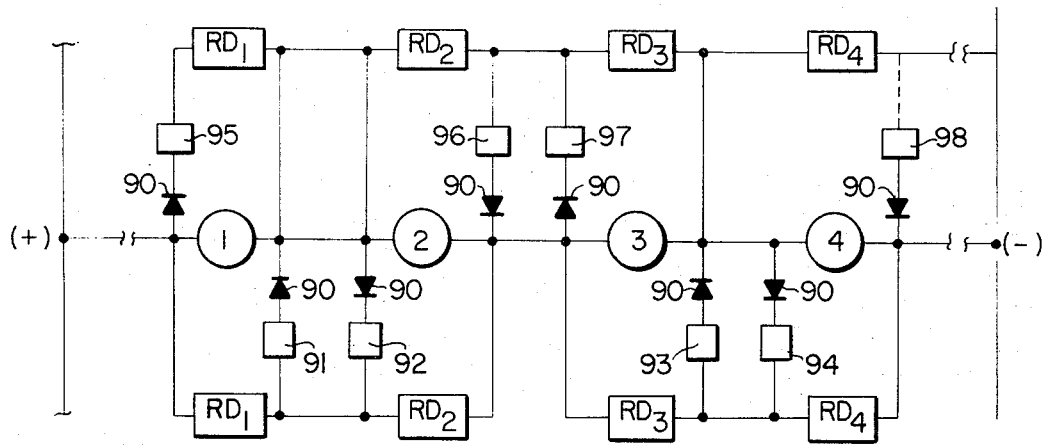
FIG. 9 is a functional block diagram of a modified form of the wheel slippage detection scheme shown in FIG. 8 with which it is possible to distinguish which traction motor is slipping and provide correction thereof.

FIGS. 8 and 9 of the drawings illustrate still different wheel slip detection techniques which utilize voltage dividing resistors for detecting wheel slip, and deriving appropriate control signals for use in overcoming the wheel slip. As shown in FIG. 8, voltage dividing resistors $RD_1$, $RD_2$, $RD_3$, and $RD_4$, are connected in parallel circuit relationship across the respective armatures 1, 2, 3, and 4 of the serially connected direct current traction motors through suitable detectors shown at 91, 92 and 93. The detectors may comprise relay windings or some other arrangement such as will be described with respect to FIG. 10. If desired the arrangement can be improved as shown in FIG. 9 of the drawings by adding diodes shown at 90 to the connection of the detectors to the voltage dividing resistor across the resepective traction motor armature 1 through 4. For convenience and simplicity, the field windings and speed control resistors have not been shown in FIG. 9. By use of the FIG. 9 arrangement, it is possible to sense which axle is slipping. Simultaneous slip of two or more axles can be detected by the provision of over-lapping resistor networks, and use of suitable relay logic to decided which axles slipped.

Figure 10:
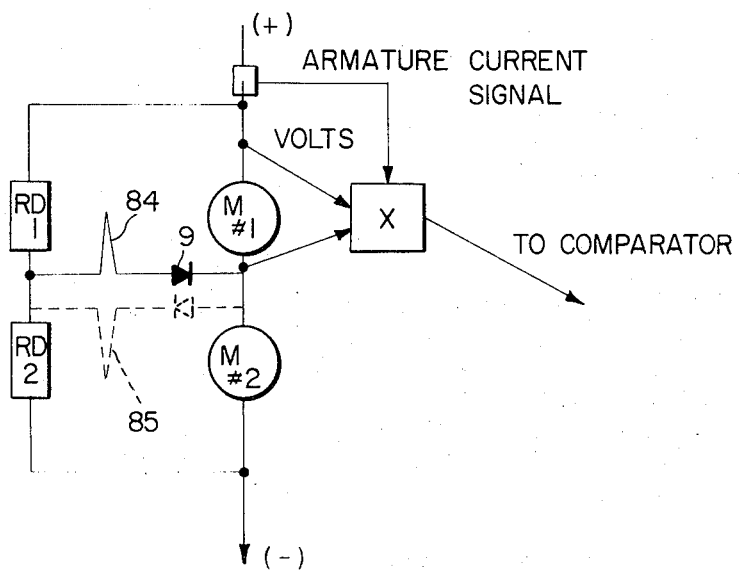
FIG. 10 illustrates one form of detector suitable for use in the wheel slip detection scheme of FIGS. 8 and 9.

As shown in FIG. 10 of the drawings, the detector used to sense slippage of one or more of the motor armatures with the arrangements of FIGS. 8 and 9, may comprise the control winding of the gate pulse generator used on the gating control circuits for the phase controlled SCRs that control the source of auxiliary field current $I_{aux}$ for the respective motors. Hence, as shown in FIG. 10, the control winding 84 for the gate pulse generator used in the gate control circuit 57 associated with traction motor No. 1 would be excited directly by any unbalance appearing in the voltage across the armature of motor No. 1 and voltage dividing resistor $RD_1$. Similar arrangements may be provided with respect to the control winding 85 of motor No. 2, motor 3, etc.

The preferred wheel slip detection and control arrangement, is as shown in FIGS. 4 and 6 of the drawings with or without the rate circuits of FIGS. 5 and 7. Further, while a magnetic amplifier type of gate control circuit or gate pulse generator has been described for use in phase controlling the SCRs employed in the diode rectifier bridges supplying the auxiliary field current $I_{aux}$, other arrangements are possible such as those depicted in the block diagram of FIG. 1, wherein the phase control SCRs are independent of the bridge rectifier, etc. Additionally, while a magnetic amplifier type gate control circuit is convenient in that it provides necessary circuit isolation between the various parts of the system and therefore is preferred, it is possible to use other kinds of gate control circuits; provided, of course, that some form of circuit isolation is included to isolate the gate control circuit and the various control inputs.

From the foregoing description, it will be appreciated that the invention provides a new and improved vehicle speed regulator for propulsion systems employing series type direct current traction motors wherein smooth, stepless changes in speed can be achieved along with automatic wheel slip control. If desired, the system could be modified to allow either positive or negative polarity current to be introduced into the series field winding whereby the field current can be either increased or decreased in a manner obvious to one skilled in the art. However, the system herein described in detail is preferred.

Having described several embodiments of a new and improved series type direct current traction motor speed regulator for propulsion systems employing series type direct current traction motor constructed in accordance with the invention, it is believed obvious that other modifications and variations of the invention will be suggested to those skilled in the art in the light of the above teachings. It is therefore to be understood that changes may be made in the particular embodiments of the invention described which are within the full intended scope of the invention as defined by the appended claims.

What is claimed is:

1. In a traction motor torque regulator for propulsion systems employing multiple series type direct current traction motors having the field and armature windings thereof connected in series electrical circuit relationship and with which smooth stepless changes in speed of operation of the traction motors is provided, the improvement comprising variable impedance means connected in series circuit relationship with the respective serially connected field and armature windings of the traction motors across a main power source of direct current excitation, main power control means for variably controlling the value of said variable impedance means to thereby variably control the torque of the direct current traction motors, means for supplying a separate excitation source of direct current connected across the respective field windings of the direct current traction motors in parallel with and in addition to the main power source, and ancillary control means for varying the magnitude of the separate direct current excitation supplied through the respective field windings indpendently of and in conjunction with the main power control means, the separate excitation source of direct current being connected across the respective field windings of the traction motors with a polarity such that the separate direct current excitation adds to the normal excitation direct current supplied to the respective field windings by the main power source through the variable impedance means and the ancillary control means controls the magnitude of the separate direct current excitation supplied to the respective field windings in a manner to control the armature current and hence the tractive effort of the respective traction motors whereby smooth stepless changes in speed of the traction motors can be achieved with the regulator.

2. A motor torque regulator according to claim 1 further including traction motor tractive effort sensing means coupled to the respective traction motors for deriving an output indication of the tractive effort thereof, means for generating an input command tractive effort reference signal representative of a desired command level of tractive effort, comparison means for comparing the input command tractive effort reference signal to the derived output indication of the measured actual tractive effort of the traction motors and deriving an output error control signal representative of any difference, and feedback means for coupling the output error control signal derived from said comarison means back to control operation of said ancillary control means for varying the magnitude of the separate direct current excitation supplied to the respective field windings independently of and complementary with the main speed control means whereby smooth stepless changes in the speed of the traction motors is achieved. the traction 3. A motor torque regulator according to claim 1 further including wheel slippage detection means for detecting slippage of the respective series type direct current traction motors and deriving an output indication of any slippage, and wheel slip control means responsive to the wheel slippage detecting means and coupled to control the ancillary control means for the slipping traction motor to reduce the field current of the slipping motor and thereby quickly reduce the tractive effort of the slipping traction motor without a corresponding reduction in the tractive effort of the remaining series non-slipping traction motors.

4. A motor torque regulator according to claim 3 further including means comprising a part of the wheel slip control means for automatically controlling the ancillary control means for the respective non-slipping traction motors to increase the field current of the non-slipping motors in series with the slipping motor automatically in response to the detection of a wheel slippage condition and thereby maintain the traction effort of the propulsion system.

5. A motor torque regulator according to claim 3 further including rate sensing and control means comprising a part of said wheel slip control means for controlling the reduction in field current of the slipping motor in accordance with the rate of slippage.

6. A motor torque regulator according to claim 2 further including wheel slippage detection means for detecting slippage of the respective series type direct current traction motors and deriving an output indication of any slippage, and wheel slip control means responsive to the wheel slippage detecting means and coupled to control the ancillary control means for the slipping traction motor to reduce the field current of the slipping motor and thereby quickly reduce the tractive effort of the slipping traction motor without a corresponding reduction in the tractive effort of the remaining series non-slipping traction motors.

7. A motor torque regulator according to claim 6 further including means comprising a part of the wheel slip control means for automatically controlling the ancillary control means for the respective non-slipping traction motors to increase the field current of the non-slipping motors in series with the slipping motor automatically in response to the detection of a wheel slippage condition and thereby maintain the traction effort of the propulsion system.

8. A motor torque regulator according to claim 7 further including rate sensing and control means comprising a part of said wheel slip control means for controlling the reduction in field current of the slipping motor in accordance with the rate of slippage.

9. A motor torque regulator according to claim 2 wherein said tractive effort sensing means comprises means for measuring the armature current of the respective traction motors, means for measuring the traction motors terminal voltage, and multiplier means responsive to the armature current measuring means and the traction motors terminal voltage measuring means for multiplying these two quantities and deriving an output indication of the actual measured tractive effort of the traction motors, and said means for generating an input command tractive effort reference signal comprises a function generator responsive to an input throttle command signal representative of the desired power commanded by an operator of the propulsion system, an input line voltage signal representative of the actual value of the main power direct current excitation voltage, and an input measured actual speed signal representative of the actual speed of the propulsion system, said function generator serving to combine these input parameters and deriving an output command tractive effort reference signal that is supplied to the comparison means.

10. A motor torque regulator according to claim 9 further including error signal comparison means responsive to the output from said first mentioned comparison means and to an input reference level error signal for deriving a second output torque controlling signal that is supplied to and controls operation of said main torque control means for variably controlling the value of said variable impedance means to thereby variably control the torque of the direct current traction motors.

11. A motor torque regulator according to claim 10 further including wheel slippage detection means for detecting slippage of the respective series type direct current traction motors and deriving an output indication of any slippage, and wheel slip control means responsive to the wheel slippage detecting means and coupled to control the ancillary control means for adjusting the value of the field current of a slipping motor in a direction to quickly reduce the tractive effort of a slipping traction motor without a corresponding reduction in the tractive effort of the remaining non-slipping traction motors.

12. A motor torque regulator according to claim 11 further including means comprising a part of the wheel slip control means for automatically controlling the ancillary control means for the respective non-slipping traction motors to increase the field current of the non-slipping motors in series with the slipping motor automatically in response to the detection of a wheel slippage condition and thereby maintain the traction effort of the propulsion system.

13. A motor torque regulator according to claim 12 further including rate sensing and control for controlling the reduction in field current of the slipping motor and the increase in current of the non-slipping motor in accordance with the rate of slippage.

14. A motor torque regulator according to claim 12 wherein said wheel slip control means comprises comparison bridge measurement means responsive to the output from said wheel slippage detecting means for deriving an unbalance output control signal indicative of a slipping traction motor, means for supplying the unbalance output control signal thus derived directly from the comparison bridge means to the ancillary control means for varying the magnitude of the direct current excitation supplied to the respective field winding of a slipping motor in a direction to reduce field current of the slipping motor, and inverse current signal generating means responsive to the unbalance output control signal developed by the comparison bridge measurement means for supplying inverse actuating control signals to the ancillary control means for varying the magnitude of the direct current excitation supplied to the respective field windings of the non-slipping motors in a direction to increase the field current of the non-slipping motors, and wherein the wheel slippage detecting means comprises tachometer generators for measuring the speed of the traction motor armatures, voltage measuring reactors for measuring the traction motor armature voltages, and the like.

15. A motor torque regulator according to claim 14 further including rate responsive circuit means coupled to said comparison bridge measurement means for deriving an unbalance output control signal indicative of slippage in a traction motor which varies in accordance with the rate of wheel speed whereby corrective additional excitation current is supplied to the respective field windings of the slipping and the non-slipping traction motors according to the rate of wheel slippage.

16. A motor torque regulator according to claim 14 wherein the wheel slip control means comprises a diode comparison bridge and the wheel slippage detecting means comprises tachometer generators for measuring the speed of the respective traction motors, diode rectifier bridge means for the respective tachometer generators having one set of diagonally opposite terminals connected across a respective tachometer generator output and a remaining set of diagonally opposite terminals connected across a load resistor, all of the load resistors having one end thereof connected to one terminal of a low voltage direct current power source and having the remaining ends thereof connected through respective ancillary control means for varying the magnitude of the direct current excitation supplied to the respective field windings of the respective traction motors and serially through respective parallel connected resistor-diode coupling networks to the mid-tap point of a pair of serially connected diodes constituting arms of the diode comparison bridge, and amplifier means connected across the diode comparison bridge and supplied from the remaining terminal of the low voltage power source for feeding back an inverse polarity correction signal to the ancillary control means for the non-slipping motors for varying the magnitude of the direct current excitation supplied to the respective field windings of the non-slipping traction motors.

17. A motor torque regulator according to claim 16 further including rate responsive circuit means coupled to the respective diode bridge means and to the respective ancillary control means of the respective traction motors for deriving unbalance output control signals indicative of slippage in the traction motors which varies in accordance with the rate of wheel speed whereby corrective additional excitation current supplied to the field windings of the respective slipping and non-slipping traction motors is adjusted according to the rate of wheel slippage.

18. A motor torque regulator according to claim 14 wherein the wheel slip control means comprises a diode comparison bridge and the wheel slippage detecting means comprises a voltage measuring reactor for measuring the speed of the respective traction motors, diode rectifier bridge means for the respective voltage measuring reactors with one set of opposite terminals connected across a respective voltage measuring reactor output and a remaining set of diagonally opposite terminals connected across a load resistor, all of the load resistors having one end thereof connected to one terminal of a low voltage direct current power source and having the remaining ends thereof connected through respective ancillary control means for varying the magnitude of the direct current excitation supplied to the respective field windings of the respective traction motors and serially through respective parallel connected resistor-diode coupling networks to the mid-tap point of a pair of serially connected diodes constituting arms of the diode comparison bridge, and emitter-follower amplifier means connected across the diode comparison bridge and supplied from the remaining terminal of the low voltage power source for feeding back an inverse polarity correction signal to the ancillary control for varying the magnitude of the direct current excitation supplied to the respective field windings of the non-slipping traction motors.

19. A motor torque regulator according to claim 18 further including rate responsive circuit means coupled to the respective diode bridge means and to the respective ancillary control means of the respective traction motors for deriving unbalance output control signals indicative of slippage in the traction motors which varies in accordance with the rate of wheel speed whereby corrective additional excitation current supplied to the field windings of the respective slipping and non-slipping traction motors is adjusted according to the rate of wheel slippage.

20. A motor torque regulator according to claim 12 wherein the field windings of said series type direct current traction motors have fewer turns than otherwise normally are provided for similar motors of the same given rating and specifications whereby auxiliary excitation current is required under most conditions to provide rated tractive effort by the motors.

21. A motor torque regulator according to claim 4 wherein the field windings of said series type direct current traction motors have fewer turns than otherwise normally are provided for similar motors of the same given rating and specifications whereby auxiliary excitation current is required under most conditions to provide rated tractive effort by the motors.

22. A motor torque regulator according to claim 1 wherein the field windings of said series type direct current traction motors have fewer turns than otherwise normally are provided for similar motors of the same given rating and specifications whereby auxiliary excitation current is required under most conditions to provide rated tractive effort by the motors.

* * * * *